United States Patent [19]

Kita et al.

[11] Patent Number: 4,975,229
[45] Date of Patent: Dec. 4, 1990

[54] PROCESS FOR PRODUCING LAMINATED RESIN FOAM

[75] Inventors: Tetsuo Kita, Saitama; Masahiro Miyazaki, Tokyo; Tsutomu Saka; Minoru Maeda, both of Saitama, all of Japan

[73] Assignee: Honda Giken Kogyo Kabushiki Kaisha, Tokyo, Japan

[21] Appl. No.: 258,074

[22] Filed: Oct. 14, 1988

Related U.S. Application Data

[63] Continuation of Ser. No. 947,028, Dec. 22, 1986, abandoned.

[30] Foreign Application Priority Data

Apr. 16, 1985 [JP] Japan ................... 61-86097
Dec. 25, 1985 [JP] Japan ................. 60-290785

[51] Int. Cl.⁵ .......................................... B29C 67/22
[52] U.S. Cl. ................... 264/45.2; 264/45.1; 264/46.6; 264/46.8
[58] Field of Search ............. 249/65; 264/45.1, 46.4, 264/46.6, 46.8, 45.2

[56] References Cited

U.S. PATENT DOCUMENTS

| | | | |
|---|---|---|---|
| 3,161,436 | 12/1964 | Hood | 297/469 |
| 3,257,149 | 6/1966 | Fruchte et al. | 264/45.1 |
| 3,264,382 | 9/1963 | Angell et al. | 264/46.6 |
| 3,423,490 | 1/1969 | Trogdon et al. | 264/46 |
| 3,918,863 | 11/1975 | Rhodes | 425/117 |
| 4,042,663 | 8/1977 | Harder, Jr. | 264/46.6 |
| 4,190,697 | 2/1980 | Ahrens | 264/46.4 |
| 4,405,681 | 9/1983 | McEvoy | 264/46.6 |
| 4,477,399 | 10/1984 | Tilton | 264/45.2 |

FOREIGN PATENT DOCUMENTS

| | | | |
|---|---|---|---|
| 3136044A1 | 9/1981 | Fed. Rep. of Germany | 27/00 |
| 57-151320 | 9/1982 | Japan | 264/45.2 |
| 56215397 | 9/1983 | Japan | 27/4 |
| 58-203027 | 11/1983 | Japan | 264/45.1 |
| 61-144315 | 7/1986 | Japan | 264/45.1 |
| 61-146514 | 7/1986 | Japan | 264/46.4 |
| 2144071A | 2/1985 | United Kingdom | 27/4 |
| 2157559A | 10/1985 | United Kingdom | 27/14 |

*Primary Examiner*—David Simmons
*Assistant Examiner*—Allan R. Kuhns
*Attorney, Agent, or Firm*—Lyon & Lyon

[57] ABSTRACT

An improved process for producing a laminated resin foam composed of two resin foam layers of different characteristic properties wherein the layers are integrally bonded together. A first foamable resin liquid for forming flexible foam is poured into a first space in a foam processing mold on one side of a barrier projecting from the wall of the mold and pouring a second foamable resin liquid for forming a foam less flexible than the first flexible foam into a second space in said foam processing mold on the other side of said barrier. The two foamable resin liquids foam beyond the barrier into contact with each other to form the two laminated foam layers. One improvement in the process includes wetting a substantial portion of the mold cavity with the first foamable resin liquid. Various shapes of molds and barriers will produce different shapes and characteristics of the resultant foam pad, such as for a car seat.

18 Claims, 13 Drawing Sheets

FIG. 10.
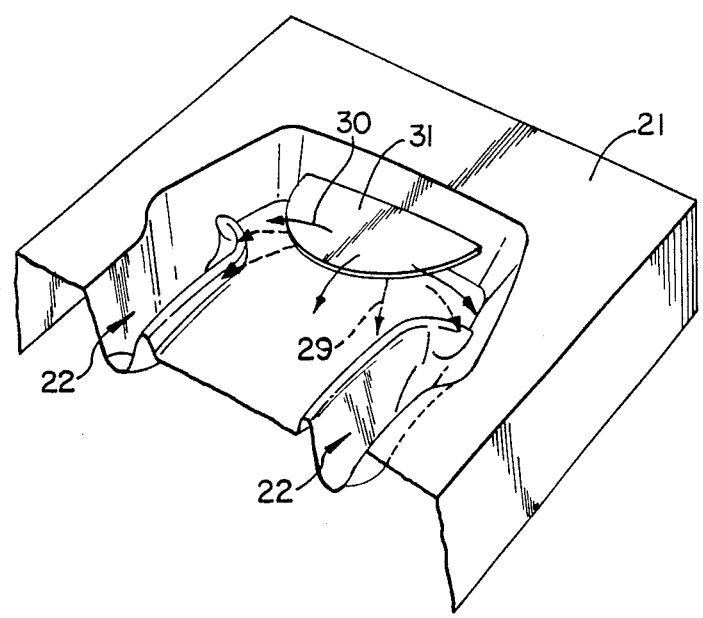
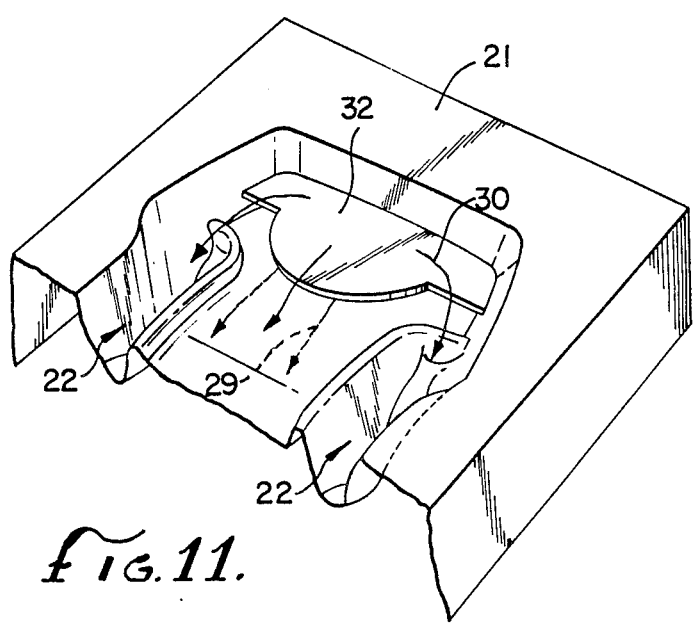
FIG. 11.

FIG. 16.
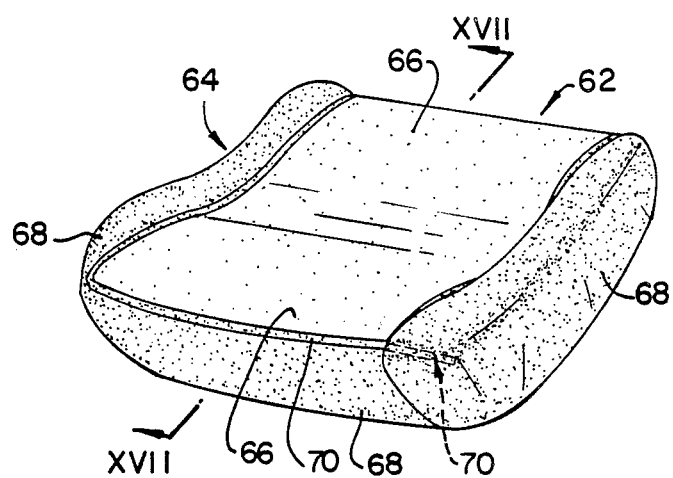
FIG. 17.
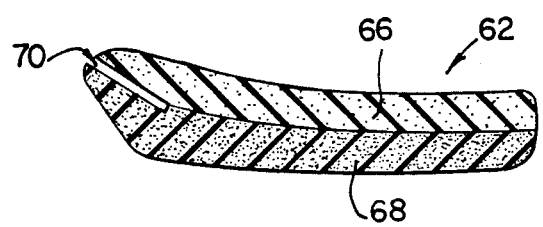
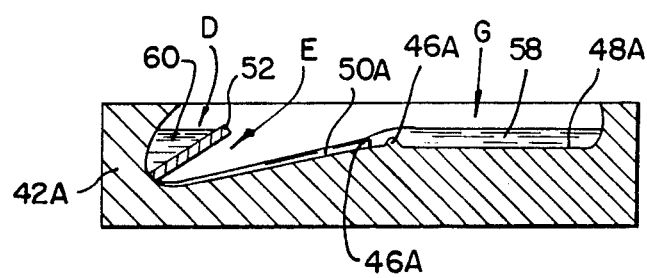
FIG. 18.

FIG. 30.
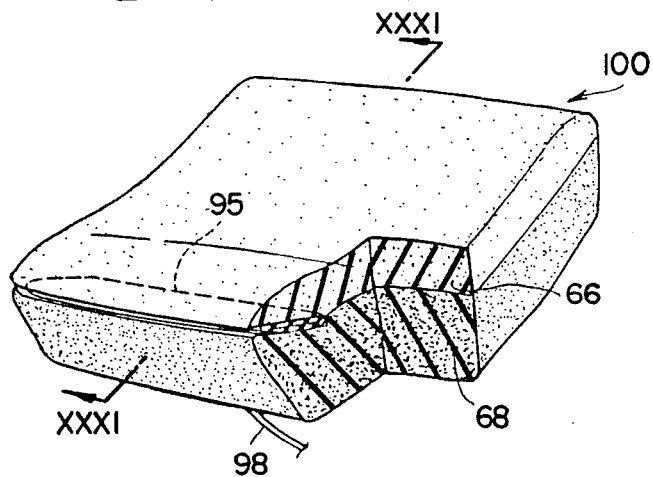
FIG. 31.
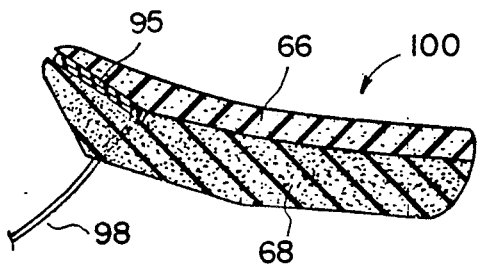
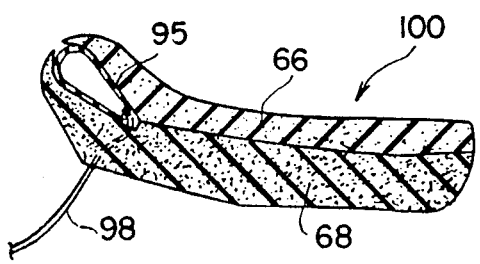
FIG. 32.

PROCESS FOR PRODUCING LAMINATED RESIN FOAM

This is a continuation of Ser. No. 947,028, filed on Dec. 12, 1986, now abandoned.

The present invention relates to a process for producing a laminated resin foam, such as the pad of an automobile seat, composed of two integrally joined resin foam layers of different characteristic properties and a mold for use in this resin foam process.

There are a variety of foam products wherein it is desirable to use two or more different foams to provide different characteristics to different portions of the product or to combine those characteristics in a certain manner. One example is the foam cushion of a car seat which will be used as the basis of this disclosure but the invention is applicable to other products.

A car seat must provide the driver with a comfortable feeling. It should be constructed such that the driver can sit in a comfortable position with a minimum of muscular motion and yet there is no undesirable seating pressure distribution which hinders the circulation of blood or promotes fatigue over a long period of time. A slightly hard pad fatigues the driver less than a soft one having an excessive springing behavior which initially may feel more comfortable.

An example of a prior art automobile seat cushion is schematically shown in longitudinal section in FIG. 1. It is constructed such that a polyurethane foam pad "a" reinforced with Victoria lawn is fixed to a zigzag spring "b" stretched across a frame "c" and the top of the pad is covered with a surface skin "d". In contrast, a recently developed automobile seat has the structure as shown in FIG. 2 wherein there is no zigzag spring "b" but rather it is constructed of single polyurethane foam pad "e" alone. However, if the pad "e" is constructed of only one type of polyurethane foam, the car seat will not meet the requirements for seat comfort and support. To cope with this problem, the pad "e" is constructed of two foams bonded with an adhesive, one being relatively flexible and the other being relatively less flexible, or the pad "e" is constructed of integrally laminated foam containing a flexible layer and a less flexible layer.

The first technique is disadvantageous in that the foams at the bonding interface are dissolved by the adhesive and tend to form a dense hard structure which adversely affects seat comfort. Another disadvantage is that the bonding needs complex steps and hinders productivity.

An example of the second technique is disclosed in U.S. Pat. No. 4,190,697. According to that patent disclosure, two kinds of foamable resin liquids are used with one providing a flexible layer and the other provided a rigid layer. One of the liquids is poured into the mold first and allowed to start foaming. Immediately thereafter, the other liquid is poured so that it flows under the previously poured liquid due to their differences in specific gravity. The foaming of the two liquids is allowed to proceed in the mold to complete the shape of the car seat (this process is the so-called Milsco process). The Milsco process has some drawbacks. It is difficult to adequately establish the interface between the flexible and rigid layers and the thicknesses of the two layers. Therefore, the resulting products are not uniform in quality. Further, in the case where the pour-in-place foam is integrally laminated with a molded urethane foam slab, the liquid infiltrates into the slab to form a hard layer which adversely affects seat comfort.

It is a principal object of the present invention to provide a process for producing a laminated resin foam in which at least two foam layers of different characteristic properties are integrally bonded and there is a minimum variation in the layer thickness ratio between or among the foam layers.

The principal object of this invention is achieved by pouring a first foamable resin liquid that gives a flexible foam into a first space in a foam processing mold, said first space being at one side of a barrier projectingly mounted on the wall of said mold, and pouring a second foamable resin liquid that gives a less flexible foam than the first resin into a second space in said foam processing mold, said second space being at the other side of said barrier, and causing the foamable resin liquids to foam, followed by curing. The mold of this invention is particularly suited for practicing this process. The first foamable resin liquid preferably is a liquid of reaction mixture or a liquid containing small bubbles.

Another object of this invention is to provide a process for forming a laminated foam product of two foam layers of accurately controlled relative thicknesses by pouring a first foamable resin liquid into the mold cavity of a lower mold and flowing the liquid along the main wall of the mold cavity to wet the wall with a film of resin over a large area, and pouring a second foamable resin liquid into a space above a barrier in the mold cavity, closing the lower mold with an upper mold, and causing the two foamable resin liquids to expand and cure.

Other and more detailed objects and advantages of this invention will appear from the following description of the various embodiments and the drawings thereof, wherein:

FIGS. 10 to 12 are perspective views of the major portions of three modified forms of foam processing molds.

FIG. 16 is a perspective view of the pad produced by using the mold of FIGS. 13-15 for molding the laminated resin foam.

FIG. 17 is a sectional view taken along the line XVII—XVII in FIG. 16.

FIG. 18 is a sectional view showing a lower mold of another embodiment for making the laminated resin foam pad.

FIG. 30 is a perspective view, with portions in section, of the pad formed in the mold of FIGS. 28 and 29.

FIGS. 31 and 32 are sectional elevation view of the pad of FIG. 30 taken on the line XXXI—XXXI and showing a deflated and inflated condition, respectively.

Figure 1:
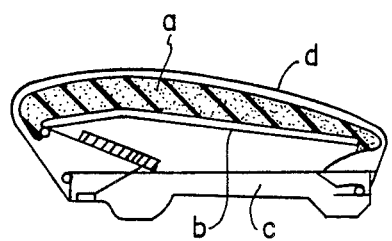
FIGS. 1 and 2 are longitudinal sectional views of the prior art automobile seat cushions.
Figure 2:
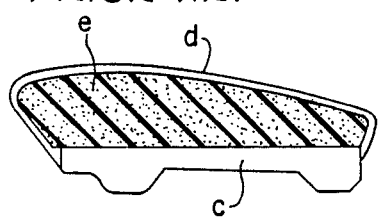
Figure 3:
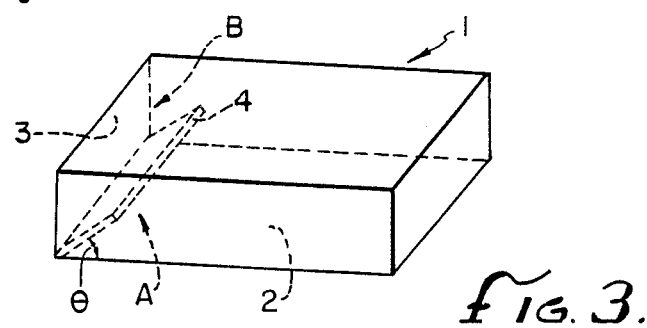
FIG. 3 is a conceptual perspective view of the foam processing mold for practicing the process of this invention.
Figure 4:
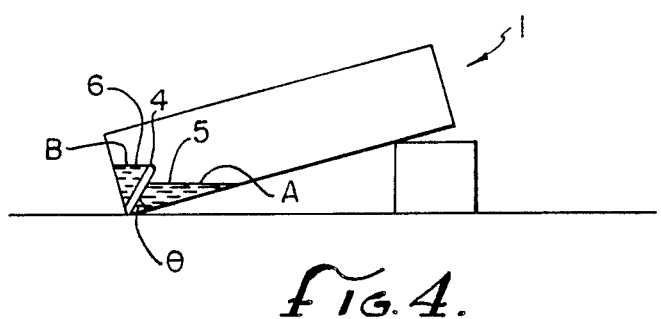
FIG. 4 is a longitudinal sectional view of the mold of FIG. 3 with two foamable resin liquids therein.

Referring first to FIGS. 3 and 4, a conceptual example of the resin foam processing mold 1 used in this invention is shown for purposes of illustrating the basic steps and principles of the process of this invention. The mold 1 has a barrier 4 which projects from the corner where the mold end wall 2 and mold bottom wall 3 intersect. The barrier divides a part of the space in the end of the mold into space A and space B, below and above, respectively, the barrier 4.

Figure 5:
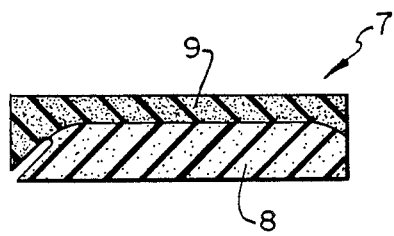
FIG. 5 is a side view of the laminated resin foam obtained by foaming the above-mentioned foamable resin liquid in the mold of FIGS. 3 and 4 followed by curing.
Figure 6:
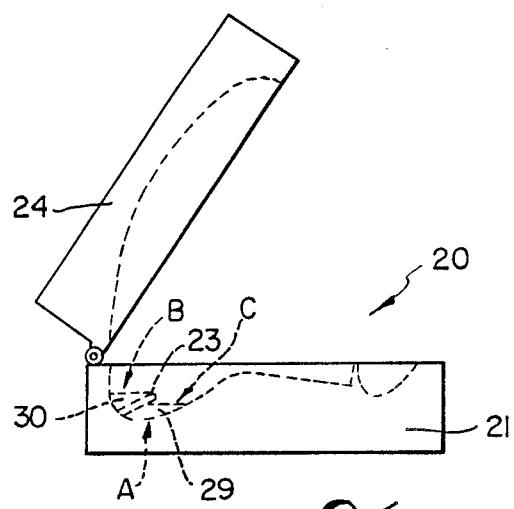
FIG. 6 is a longitudinal sectional view of the foam processing mold for an automobile seat cushion, with two foamable resin liquids therein.
Figure 8:
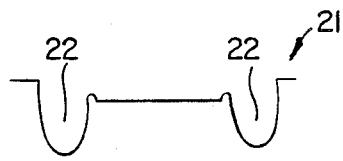
FIG. 8 is a sectional view taken along the line VIII—VIII in FIG. 7.
Figure 7:
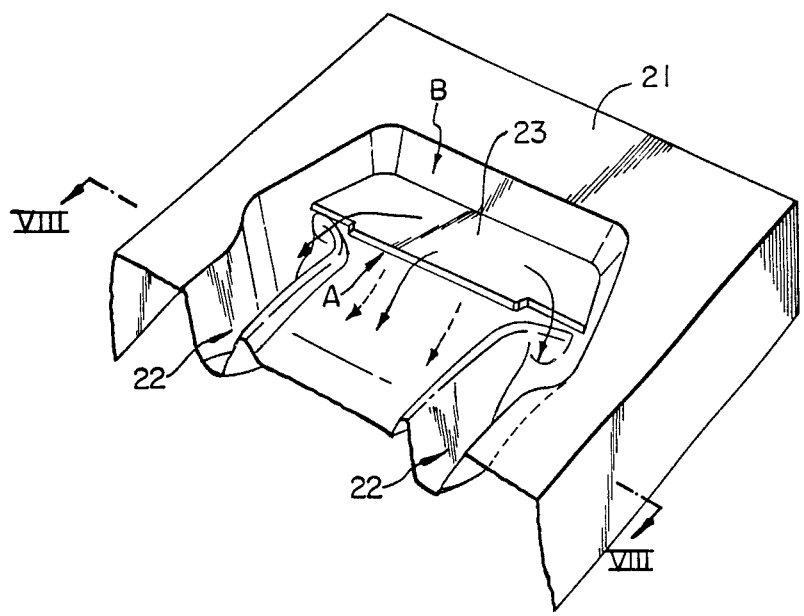
FIG. 7 is a perspective view of the major portion of the mold.

The foam processing method of this invention using the mold 1 is accomplished as follows: With the mold 1 positioned on a slant as shown in FIG. 4, a first foamable resin liquid 5 that produces a flexible foam is poured into the bottom space A and a second foamable resin liquid 6 that produces a less flexible foam than liquid 5 is poured into upper space B. The foamable resin liquid will be referred to as hereinafter simply "liquid". The liquids 5 and 6 are allowed to expand, followed by curing. At the start of the process, the liquids 5 and 6 expand along the barrier 4. After they have expanded beyond the edge of the barrier 4, they join each other and continue to expand, forming the flexible layer 8 and the rigid layer 9 (which is rigid in the sense of being less flexible than the flexible layer 8). As a result, there is formed the laminated resin foam 7 composed of flexible and rigid layers having a small gap 10 formed by the barrier 4, as shown in FIG. 5. The thicknesses of the flexible layer 8 and the rigid layer 9 can be properly adjusted by changing the length of the barrier 4, the angle 8 of the barrier 4 with respect to the mold wall 3, and the amount of the liquids 5 and 6. If these parameters are kept constant, the foam products are consistently produced with a minimum of thickness fluctuation.

It is also possible to adjust the thicknesses of the flexible layer 8 and the rigid layer 9 if the amount of the liquids 5 and 6 is changed, the pouring place is changed, and the foaming time is changed.

Referring now to FIGS. 6 to 9, the process of this invention will be explained with reference to producing a topper pad 25 for an automobile seat wherein a mold 20 is comprised of a mold 21 and the hinged lid 24 to close the mold 21. The mold 21 has a barrier 23 (similar to the barrier 4 in the mold 1) and grooves 22 at both sides. After the mold 20 has been heated in an oven, the liquid 29 to give a flexible foam is poured into the space A at one side of the barrier 23, and the liquid 30 to give a rigid foam is poured into the space B at the opposite side of the barrier 23. The lid 24 is closed and the liquids 29 and 30 are allowed to expand, followed by curing. The flexible layer 26 formed by liquid 29 fills the space C (including the space A) adjacent to the base wall of the mold 21, and the rigid layer 27 formed by liquid 30 fills the remainder of the mold space. Thus, there is formed the integrally molded pad 25 of the flexible layer 26 and the rigid layer 27. In an automobile seat cushion, the flexible layer 26 is a top layer to support the driver's thighs, and the rigid layer 27 constitutes the other parts of the seat including the projecting side parts formed by the grooves 22 and the rear part. The small gap 28 resulting from the barrier 23 remains between the flexible layer 26 and the rigid layer 27 at their front edge.

Since the rigid layer 27 constitutes the bottom part, raised side parts, and rear part, the pad 25 withstands loads in any direction, keeping its shape and supporting the driver in a stable position. In addition, the pad 25 provides very good seat comfort because the flexible layer 26 supports the driver's thighs and the small gap 28 formed between the flexible layer 26 and the rigid layer 27 at the front edge uniformly distributes the seating pressure.

Being integrally bonded at the time of foaming, the flexible layer 26 and the rigid layer 27 constituting the pad 25 are free of the adverse effects resulting from the use of an adhesive and they maintain their cushioning properties as such.

Figure 9:
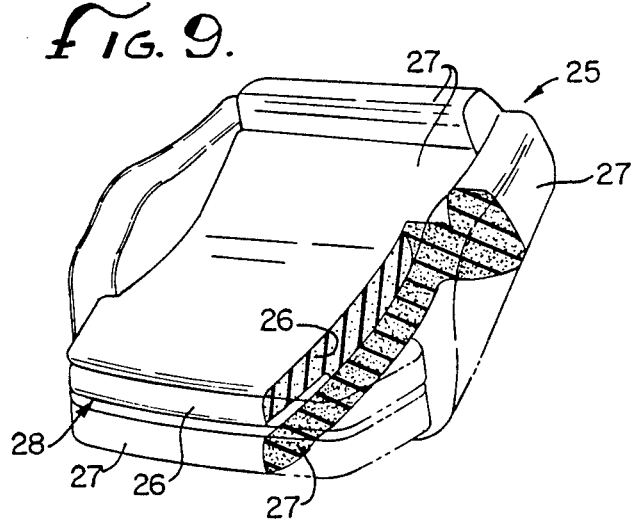
FIG. 9 is a partly cutaway perspective view of the pad formed by the method of this invention in the mold of FIGS. 6, 7 and 8.

In this first example, the barrier 23 is an approximately rectangular plate projecting from the mold proper 21 of the mold 20 but with notches cut out of the ends for allowing the foam layer 26 to migrate downwardly toward the grooves 22 during foaming, as shown by the arrows in FIG. 9. However, for various purposes the shape of the barrier may be modified, such as the barriers 31, 32, and 33 shown in FIGS. 10 to 12.

In the case of the barrier 31 shown in FIG. 10, which is approximately semicircular, the liquid 29 to give the flexible foam and the liquid 30 to give the rigid foam expand in the radial direction as indicated by the arrows, and they combine into one before the liquid 30 enters the grooves 22. Therefore, the joining interface of the two layers will be sufficiently large to achieve a suitable connection between the two layers.

The barrier 32 shown in FIG. 11 is a compromise between the barrier 23 and the barrier 31. The barrier 32 permits the liquid 29 forming the flexible foam and the liquid 30 forming the rigid foam to expand in the direction of arrows. Being supported by the barrier 32, the liquid 30 which is to enter the grooves expands and advances without combining with the liquid 29, as occurs in the mold of FIG. 10.

Figure 12:
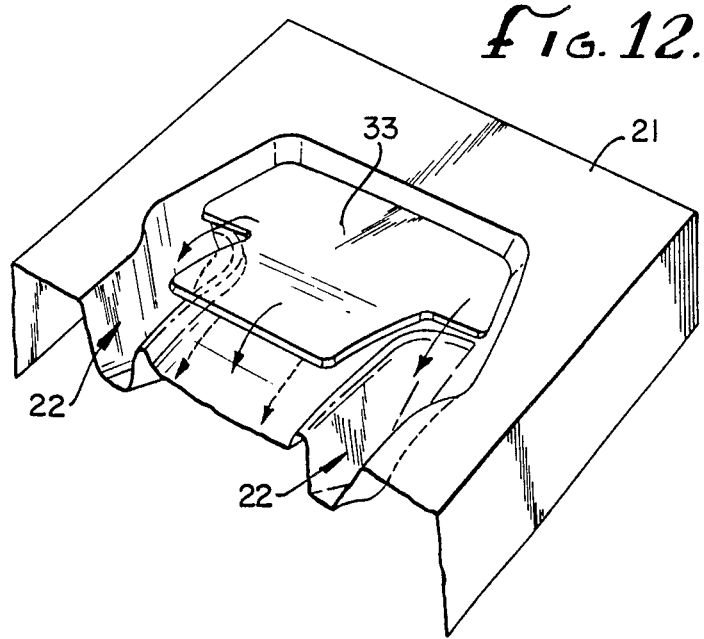
Figure 15:
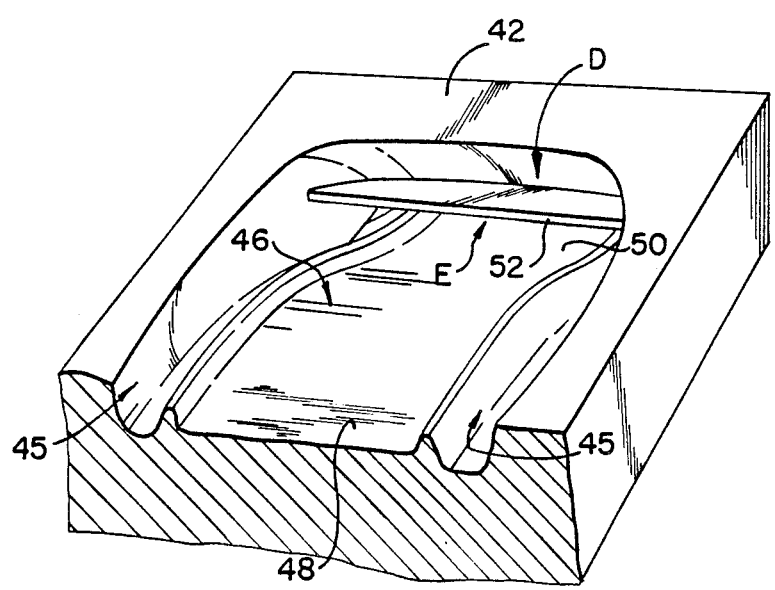
FIG. 15 is a perspective view of the major portion of the lower mold shown in FIGS. 13 and 14 for molding the laminated resin foam.
Figure 13:
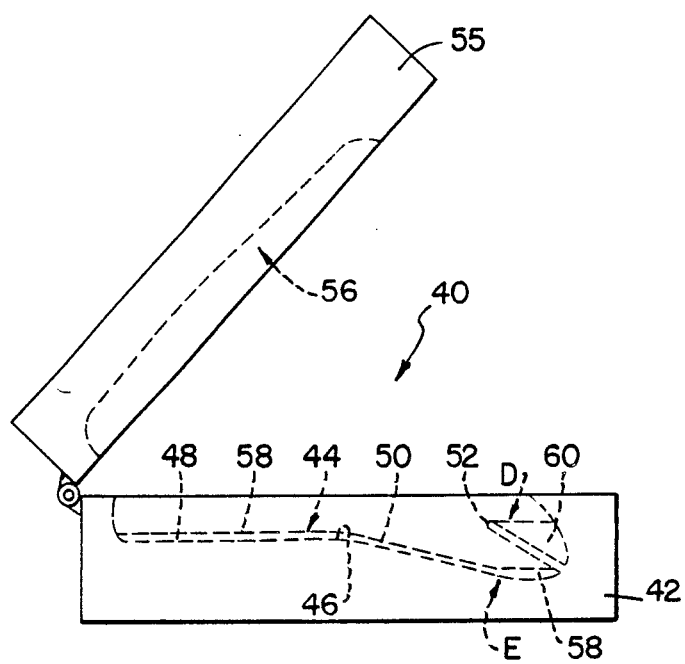
FIG. 13 is a side view similar to FIG. 6 but showing a mold for forming the laminated resin foam in accordance with a modified embodiment of this invention for producing a further improved foam pad of the automobile seat cushion.
Figure 14:
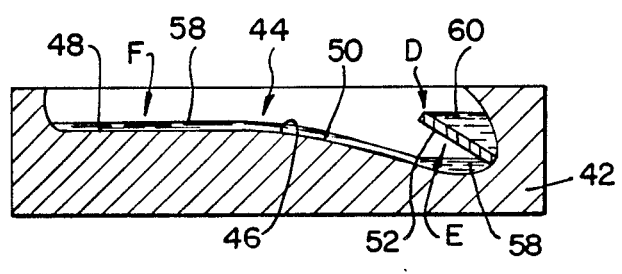
FIG. 14 is a sectional view of the lower half of the mold of FIG. 13.

The barrier 33 shown in FIG. 12 is a modification of the barrier 32 with the semicircular portion greatly extended. This barrier makes it possible to accurately control the thicknesses of the flexible and rigid layers and hence to reduce product-to-product variation. In the case of the pad made by using this barrier, the gap between the two layers extends for a substantial distance between the layers. Each form of the barrier has a sufficient size to separate the two liquid resins, at least at the outset for the foaming to start without combining and mixing all of the liquid.

As thus far described, the present invention provides a process for producing a laminated resin foam which comprises pouring a foamable resin liquid that gives a flexible foam into a first space in a foam processing mold, said first space being at one side of a barrier projecting from a wall of said mold, and pouring a foamable resin liquid that gives a foam less flexible than said flexible foam into a second space in said foam processing mold, said second space being at the other side of said barrier, and causing the foamable resin liquids to foam, followed by curing. The process carried out by using the mold provided with the barrier produces a laminated resin foam in which the flexible and rigid foam layers combine in one, without the necessity for any further treatment. Therefore, the process improves the productivity, makes it easy to control the thicknesses of the flexible and rigid layers, and provides laminated resin foam of stable quality.

As a further improvement in this process, it has been found that certain steps can be taken and variations in the molds made to produce better and specialized foam products. Again, the invention will be described in connection with an automobile seat cushion pad as an example but it will readily appear to those skilled in the art that various products can be advantageously formed by this process and with these molds.

Referring now to FIGS. 13 to 17, the mold 40 is designed to produce the pad 62 for the automobile seat cushion. The mold 40 is made up of the lower mold 42 and the upper mold 55, in which the cavities 44 and 56 are formed, respectively. The cavity 44 and a main wall 46 consisting of the horizontal wall 48 and the retracted wall 50. A barrier 52 extends upwardly at a slant from the retracted wall 50 which corresponds to the front edge of the pad 62. In addition, the side grooves 45 which correspond to the raised side parts of the pad 64 are formed in the cavity 44. The barrier 52 divides a portion of the cavity 44 into the upper space D and the lower space E.

The mold 40 of the above-mentioned structure is used in the following manner to produce the pad 62. The pad 62 is composed of the flexible layer 66 which is the top layer of the seat and the rigid layer 68 which includes the lower layer and the side parts. There is a small gap 70 formed by the barrier 52 between the flexible and rigid layers at the front edge of the seat.

In order to form the seat pad 62 in the mold 40 in this improved process, a mold release agent is applied to the inside wall of the mold 40. The first foamable resin liquid 58 for forming the flexible layer 66 is poured onto the horizontal wall 48 as indicated by arrow F, with the mold placed at the normal horizontal position. The first foamable resin liquid 58 spreads over the horizontal wall 48 and flows along the inclined retracted wall 50 to enter the space E divided by the barrier 52. The pouring should be performed in such a manner that the dispenser is properly moved so that the wall 46 is wetted with the first foamable resin liquid 58 and over a large area. After the pouring of the first foamable resin liquid 58, the second foamable resin liquid 60 for forming the rigid layer 68 is poured into the space D divided by the barrier 52. The upper mold 55 is placed on the lower mold 42, and the first and second foamable resin liquids 58 and 60 are allowed to expand, followed by curing. If necessary, the mold may be heated in an oven. These steps produce a pad 62 in which the flexible layer 66 and the rigid layer 68 are formed at a desired thickness ratio over the entire surface area of the seat.

The thickness of the first foamable resin liquid 58 covering the main wall 46 can be adjusted by changing the position (e.g. by tilting) of the mold 42. Depending on this adjustment, the thickness ratio of the flexible layer 66 to the rigid layer 68 may be uniform or locally different. This is ensured because the first foamable resin liquid 58 (unlike the foamable resin liquid 29 in the previously described embodiments of FIGS. 3–12) expands not only in the space E but also all over the main wall 46.

Figure 19:
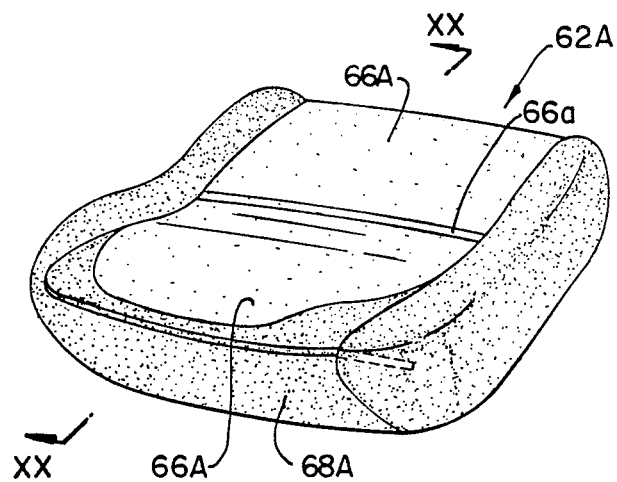
FIG. 19 is a perspective view of the pad produced by using the mold shown in FIG. 18.
Figure 20:
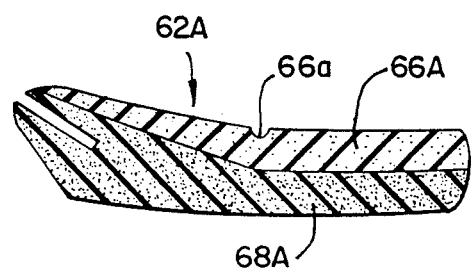
FIG. 20 is a sectional view taken along the line XX—XX in FIG. 19.

Referring now to a second embodiment of this improved method as shown in FIGS. 18 to 20, the lower mold 42A has a ridge 46a in the crosswise direction on the major wall 46A. Because of this ridge 46a, the first foamable resin liquid 58 poured onto the horizontal wall 48A forms a thicker liquid layer (indicated by arrow G) on the horizontal wall 48A than on the retracted wall 50A. Therefore, the resulting pad 62A has a flexible layer 66A which is thicker in the rear part than in the front part. The groove 66a is formed by the ridge 46a. In this way, the ridge 46a makes it possible to change the thickness ratio of the flexible layer 66A to the rigid layer 68A.

Figure 21:
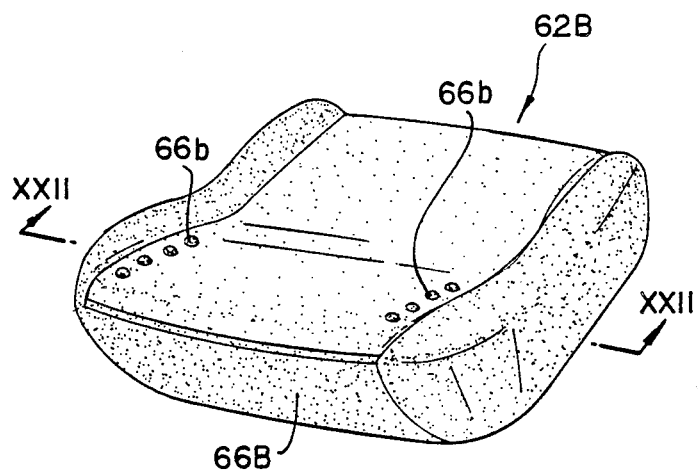
FIG. 21 is a perspective view of the pad produced by using a similar mold for molding the laminated resin foam of a further embodiment.
Figure 22:
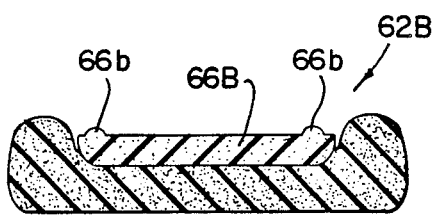
FIG. 22 is a sectional view taken along the line XXII—XXII in FIG. 21.

Referring to a third embodiment of this improved method as shown in FIGS. 21 and 22, the pad 62B has a plurality of small projections 66b on the seat surface of the flexible layer 66B near the front part. These small projections 66b are formed by a plurality of small concave recesses formed on the main wall of the lower mold. The shape and dimensions of the small projections 66b can be changed by changing the shape of the concave recesses. Moreover, the flexible layer 66B near the small projections can be changed in thickness. The small projections 66b on the seat surface of the pad 62B give a varied seat comfort.

Figure 23:
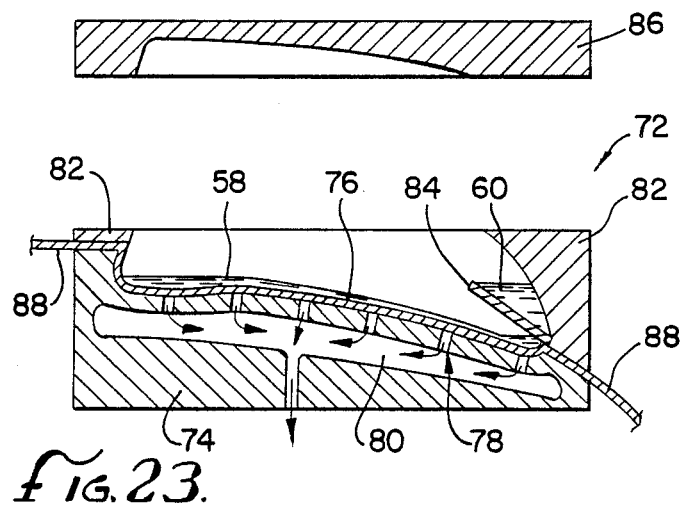
FIG. 23 is a sectional view showing a similar mold for molding the laminated resin foam pad of still another embodiment.
Figure 24:
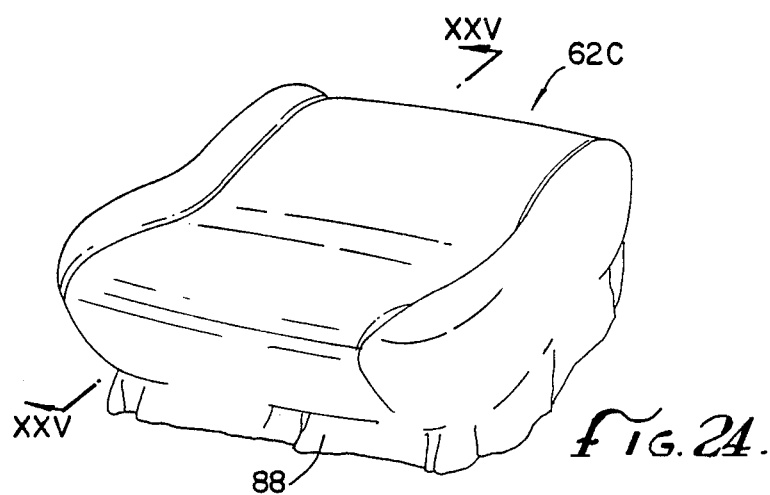
FIG. 24 is a perspective view of the pad produced by using the mold shown in FIG. 23.
Figure 25:
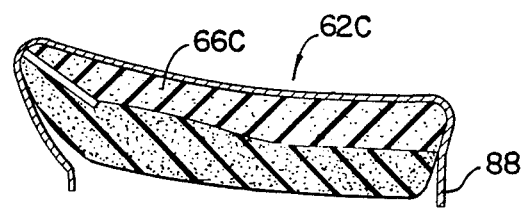
FIG. 25 is a sectional view taken along the line XXV—XXV in FIG. 24.

Referring to a fourth embodiment of this improved method as shown in FIGS. 23 to 25, the mold 72 is made up of the lower mold 74, the first upper mold 82, and the second upper mold 86. The lower mold 74 has a degasing chamber 80, and the main wall of the lower mold 74 has a plurality of small openings 78 which communicate with the degasing chamber 80. A seat surface skin 88 is applied to the main wall 76 and the peripheral wall of the lower mold 74, and the degasing chamber 80 is evacuated, whereby the surface skin 88 is tightly pressed against the main wall 76. The peripheral part of the surface skin 88 is pinched between the lower mold 74 and the first upper mold 82, whereby the surface skin 88 is fixed in position. Then, the first foamable resin liquid 58 is poured onto the surface skin 88 so that the liquid 58 wets the surface skin 88 over a large area. The second foamable resin liquid 60 is poured into the space above the barrier 84 projecting in the first upper mold 82. Subsequently, the second upper mold 86 is placed on the first upper mold 82, whereby the mold 72 is closed. The first and second foamable resin liquids 58 and 60 are heated, expanded, and cured in the same manner as in the above-mentioned embodiments. Thus there is obtained the pad 62C having the integrally bonded surface skin 88. According to this process, the first foamable resin liquid 58 is expanded after the surface of the surface skin 88 has been moistened with the first foamable resin liquid 58. Therefore, a firm bonding is made between the flexible layer 66c and the surface skin 88 and no air is entrapped between the flexible layer 66 and the surface skin 88. The pad 62C thus produced has a good appearance and improved durability.

Figure 26:
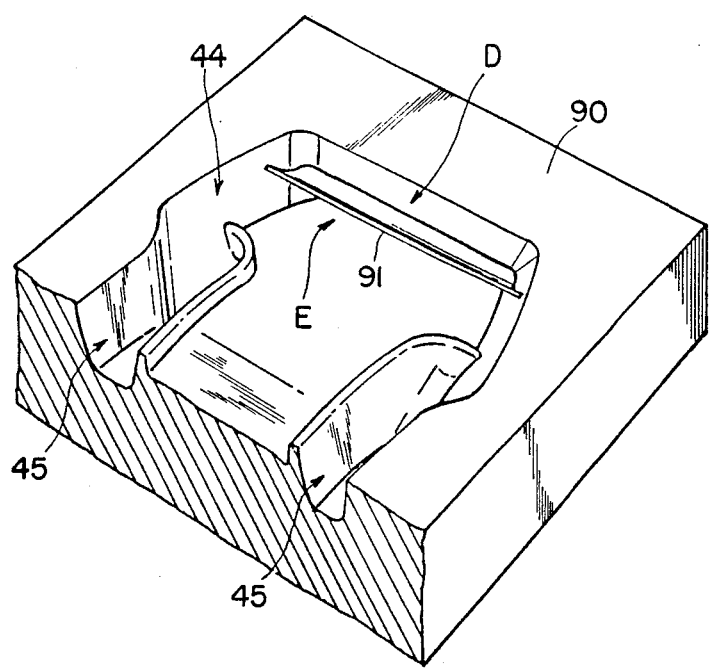
FIG. 26 is a perspective view of another embodiment of a mold for molding the laminated resin foam pad.
Figure 27:
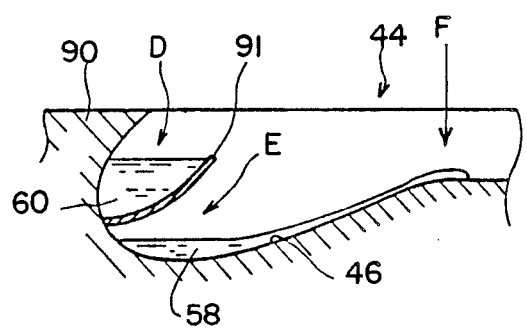
FIG. 27 is a sectional elevation view of a portion of the mold of FIG. 26.
Figure 28:
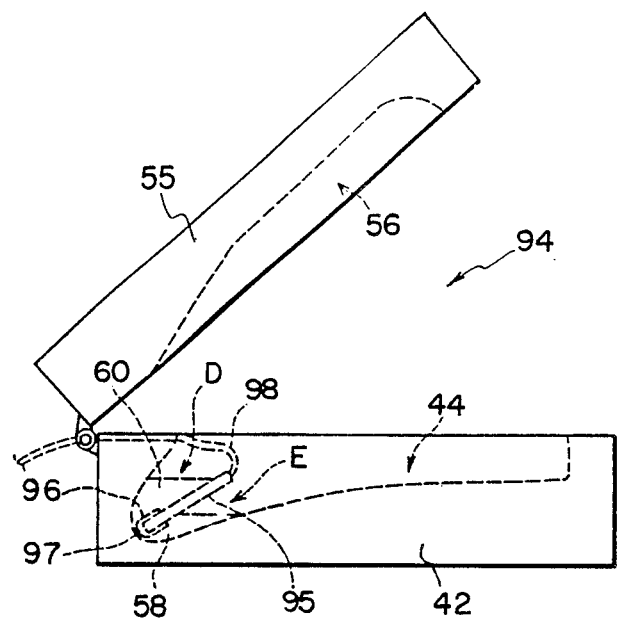
FIG. 28 is a side elevation view of still another embodiment of the mold of this invention for practicing the process for molding a laminated resin foam.
Figure 29:
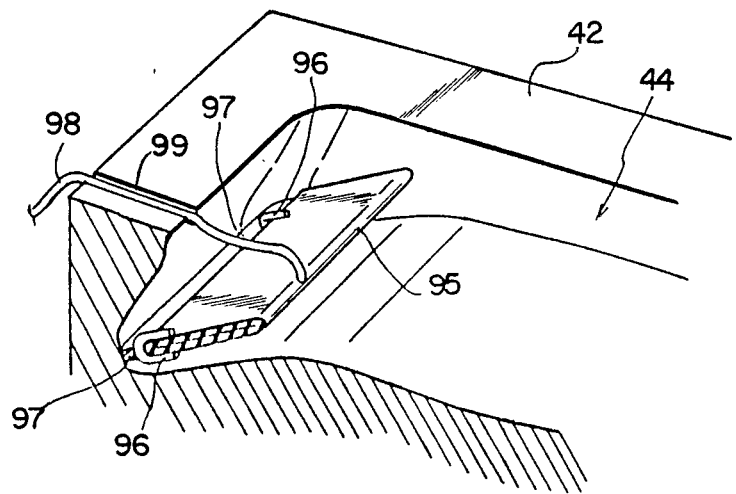
FIG. 29 is a perspective view of a portion of the lower mold shown in FIG. 28.

Referring now to FIGS. 26 and 27, another embodiment of the mold of the present invention is shown. The mold 90 has a cavity 44 with a pair of grooves 45 similar to the previous molds. An inflatable barrier 91 is mounted on the front wall 92 of the mold 90 and curves outwardly and upwardly. The front wall 92 is substantially curved to provide the desired seat pad shape. The barrier 91 is inflated to its desired shape. Again, the first liquid 58 for forming the flexible foam layer is poured onto the bottom wall 46 in the direction of arrow F to wet the bottom wall with the excess flowing into the space E below the barrier 91. The second liquid 60 is poured in the space D above the barrier 91 and the foaming of the two liquids is allowed to proceed. After curing, the seat pad may be removed easily by deflating the barrier 91 to allow it to flex freely as the pad removed.

Referring now to FIGS. 28 to 32, another embodiment of the present invention is shown which employs a mold 94 comprised of an upper mold 55 and a lower mold 42 similar to the previous molds. Upper mold 55 has a cavity 56 and lower mold 42 has a cavity 44. In this embodiment the barrier is comprised of an air bag 95 extending across the lower mold cavity 44 and supported by U-shaped hooks 96 which are in turn supported by a rib 97 mounted at the base of the front wall of the cavity 44. The air bag has an inflation tube 98 extending from its upper edge at a midpoint along that upper edge. The tube 98 extends out of the mold 94 between the upper and lower molds 55 and 42 at the hinged edge through a slot 99 in the face of the lower mold 42. The air bag 95 comprises the barrier forming the upper space D and the lower space E for receiving the two foamable resin liquids 60 and 58, respectively, for forming the two layers 68 and 66 of the seat pad 100 in the same manner as previously described. The air bag 95 is adhered to the foam layers and forms part of the pad 100 with the inflation tube 98 extending out the bottom. The air bag 95 may be inflated to any desired amount by using the tube 98 to provide the proper support and comfort to the occupant of the seat. Thus, the air bag 95 serves the function of a barrier in the molding process and an adjustable cushion in the finished seat pad 100.

According to this improved process of this invention shown in FIGS. 5–32, a laminated resin foam is produced by pouring a first foamable resin liquid into the mold cavity of the lower mold and flowing the liquid along the main wall of the mold cavity so that the liquid wets the main wall of the mold cavity to form a liquid film over a large area thereof, and pouring a second foamable resin liquid into the space above a barrier in the mold cavity, closing the upper and lower molds, and expanding the two foamable liquids, followed by curing, with said barrier dividing a part of the molding space into upper and lower spaces and permitting different foamable resin liquids to be poured separately. Therefore, the process of this invention makes it possible to produce a laminated resin foam composed of two resin foam layers of different characteristic properties, said layers being integrally bonded together, by simultaneous foaming technique. The resulting foam has a uniform ratio of layer thicknesses over the entire surface thereof or has a locally changed ratio of layer thicknesses as desired. Thus, the process of this invention provides high-quality resin foams of laminate structure.

What is claimed:

1. A process for producing a laminated product having at least two integrally bonded, vertically spaced resin foam layers in a mold cavity comprising the steps of:
   dividing said mold cavity at one end thereof by a partition into two vertically spaced spaces that both communicate longitudinally with the remainder of the mold cavity;
   supplying a first foamable resin liquid to a first of said spaces;
   supplying a second foamable resin liquid to a second of said spaces;
   establishing expansion of said first and second foamable resin liquids initially separately in said spaces into the respective of said layers; and
   thereafter, directing the expansion of said first and second resin liquids by said partition longitudinally from said spaces into the remainder of said mold cavity to place the layers produced by said liquids into mutual bonded contiguity until said mold cavity is filled.

2. The process of claim 1 including the step of curing the molded product.

3. The process of claim 1 in which said second space that receives said second foamable resin liquid is above that receiving said first foamable resin liquid and including the step of expanding said foamable resin liquids into said remainder of said mold cavity to place the layer produced by said second foamable resin liquid into mutual bonded contiguity with the upper surface of the layer produced by said first foamable resin liquid.

4. The process of claim 3 in which the foam layered formed by said second foamable liquid resin is less flexible than that formed by said first foamable liquid resin.

5. The process of claim 4 including the step of dividing the flow of said second foamable liquid resin and directing it along three discrete paths contiguous with said layer formed by said first foamable liquid resin along the top and opposite sides thereof.

6. The process of claim 1 including the step of wetting substantially the entire bottom surface of said mold cavity with said first foamable resin liquid prior to causing said first and second foamable resin liquids to expand.

7. The process of claim 6 in which the surface of said mold cavity is wetted by supplying said first foamable resin liquid to said mold cavity at a location remote from said first space and causing it to flow by gravity along the surface of said mold cavity from said remote location to said first space.

8. The process of claim 7 including the step of obstructing the flow of said first foamable resin liquid between said remote location and said first space to retain an increased amount of said first foamable resin liquid in the region of said remote location when expansion of said foamable resin liquids is initiated.

9. The process of claim 8 including the step of covering said mold cavity surface with a surface skin prior to supplying said first foamable resin liquid to said remote location whereby said surface skin is wetted by said first foamable resin liquid in flowing from said remote location to said first space.

10. The process of claim 9 including the step of evacuating gas from the region of said mold cavity between said mold cavity surface and said surface skin to conform said surface skin tightly with said mold cavity surface.

11. The process of claim 2 in which said partition is inflatable and including the step of maintaining said partition inflated at least during the expansion of said first and second foamable resin liquids and during the curing thereof and, thereafter, deflating said partition for removal from said product.

12. A process for producing a composite product having a laminated central section containing at least two layers of integrally bonded resin foam materials of different characteristic properties and oppositely spaced side sections formed of one of said resin foam materials in a mold cavity having a central region for the formation of said laminated central section and grooves in lateral oppositely spaced relation to said central region for the formation of said oppositely spaced side sections, comprising the steps of:
dividing said mold cavity in said central region at one end thereof by a partition into two vertically spaced, laterally extending spaces that communicate with the remainder of said mold cavity;
supplying a first foamable resin liquid to a first space in said central region of said mold cavity;
supplying a second foamable resin liquid to a second space in said central region of said mold cavity;
diverting part of said second foamable resin liquid from said second space in said mold cavity into each of said grooves; and
directing the expansion of said first and second foamable resin liquids in said spaces into laterally extending layers initially separately and, thereafter, outwardly from said spaces into mutual, bonded contiguity and into bonded contiguity with the diverted part of said second foamable resin liquid expanded from said grooves until said mold cavity is filled, whereby said central section of said product contains bonded laminated layers of said first and second foamable resin liquid and said side sections are formed by the expanded second foamable resin liquid and are bonded to said layers of said central section.

13. The process of claim 12 including the step of curing the molded product.

14. The process of claim 13 in which the expansion of said second foamable resin liquid places a layer produced thereby in overlying bonded contact with the layer produced by said first foamable resin liquid in said central region of said mold cavity and side sections bonded to said layers on laterally spaced sides thereof.

15. The process of claim 14 in which the expanded product of said second foamable resin liquid is less flexible than that of said first foamable resin liquid.

16. The process of claim 15 including the step of wetting substantially the entire bottom surface of the central region of said mold cavity with said first foamable resin liquid prior to causing said first and second foamable resin liquids to expand.

17. The process of claim 16 in which said bottom surface of said central region of said mold cavity is wetted by supplying said first foamable resin liquid to said bottom surface of said mold cavity at a location remote from said first space and causing it to flow by gravity from said remote location to said first space.

18. The process of claim 17 including the step of obstructing the flow of said first foamable resin liquid between said remote location and said first space to retain an increased amount of said first foamable resin liquid in the region of said remote location when expansion of said foamable resin liquids is initiated.

* * * * *